(12) United States Patent
Usowicz et al.

(10) Patent No.: US 8,281,812 B2
(45) Date of Patent: Oct. 9, 2012

(54) VALVE WITH LOW FRICTION COATING

(75) Inventors: James E. Usowicz, Webster, MA (US); Theodore C. Ciolkosz, Milton, MA (US); Marc Lemelin, Whitinsville, MA (US)

(73) Assignee: Waters Technologies Corporation, Milford, MA (US)

( * ) Notice: Subject to any disclaimer, the term of this patent is extended or adjusted under 35 U.S.C. 154(b) by 1082 days.

(21) Appl. No.: 10/598,316

(22) PCT Filed: Mar. 2, 2005

(86) PCT No.: PCT/US2005/006670
§ 371 (c)(1),
(2), (4) Date: Jun. 23, 2008

(87) PCT Pub. No.: WO2005/093300
PCT Pub. Date: Oct. 6, 2005

(65) Prior Publication Data
US 2008/0258094 A1 Oct. 23, 2008

Related U.S. Application Data

(60) Provisional application No. 60/550,782, filed on Mar. 5, 2004.

(51) Int. Cl.
*F16K 11/074* (2006.01)
(52) U.S. Cl. .................. 137/625.15; 251/208; 251/304; 251/368
(58) Field of Classification Search .................. 251/208, 251/368; 137/625.15; 73/863.71, 72, 73, 73/864.83, 864.84
See application file for complete search history.

(56) References Cited

U.S. PATENT DOCUMENTS

| 3,747,630 A | 7/1973 | Hurrell |
| 4,382,100 A | 5/1983 | Holland |
| 4,440,382 A | 4/1984 | Pruvot et al. |

(Continued)

FOREIGN PATENT DOCUMENTS

JP 2001-307575 A 12/1989
(Continued)

OTHER PUBLICATIONS

Cavaleiro and De Hosson, Nano Structured Coatings, 2006 Springer Scient + Business Media, LLC, pg. 162-163 Micro Structructures of Diamond Like Carbon Multilayers.*

*Primary Examiner* — John K Fristoe, Jr.
*Assistant Examiner* — Matthew W Jellett
(74) *Attorney, Agent, or Firm* — Guerin & Rodriguez, LLP

(57) ABSTRACT

Embodiments of the present invention feature a method and device for controlling the flow of fluid. One embodiment of the device for controlling the flow of fluid comprises a rotor, stator and compression means. The rotor has a rotor fluid communication means and at least one rotor load bearing surface. The rotor load bearing surface sealably engages a stationary load bearing surface. The rotor is capable of assuming a first position and a second position by rotation. The stator has a stationary load bearing surface having stator fluid communication means. The stationary load bearing surface sealably engages the rotor load bearing surface and permits rotation of the rotor with respect to the stator. At least one of the rotor bearing surface and said stator load bearing surface has a diamond-like carbon-silica coating.

23 Claims, 3 Drawing Sheets

U.S. PATENT DOCUMENTS

| | | | |
|---|---|---|---|
| 4,444,066 A * | 4/1984 | Ogle et al. | 73/863.72 |
| 5,135,808 A | 8/1992 | Kimock et al. | |
| 5,190,807 A | 3/1993 | Kimock et al. | |
| 5,207,109 A * | 5/1993 | Olsen | 73/863.73 |
| 5,268,217 A | 12/1993 | Kimock et al. | |
| 5,506,038 A | 4/1996 | Knapp et al. | |
| 5,527,596 A | 6/1996 | Kimock et al. | |
| 5,618,619 A | 4/1997 | Petrmichi et al. | |
| 5,635,245 A | 6/1997 | Kimock et al. | |
| 5,643,423 A | 7/1997 | Kimock et al. | |
| 5,653,812 A | 8/1997 | Petrmichl et al. | |
| 5,679,413 A | 10/1997 | Petrmichl et al. | |
| 5,819,798 A | 10/1998 | Claflin et al. | |
| 6,012,487 A * | 1/2000 | Hauck | 137/625.11 |
| 6,012,488 A * | 1/2000 | Nichols | 137/625.11 |
| 6,080,470 A * | 6/2000 | Dorfman | 428/216 |
| 6,155,123 A * | 12/2000 | Bakalyar | 73/864.83 |
| 6,453,946 B2 * | 9/2002 | Nichols et al. | 137/625.15 |
| 6,508,416 B1 * | 1/2003 | Mastro et al. | 239/585.1 |
| 6,672,336 B2 * | 1/2004 | Nichols | 137/625.46 |
| 6,719,001 B2 * | 4/2004 | Ahlgren et al. | 137/312 |
| 6,904,935 B2 * | 6/2005 | Welty et al. | 137/625.17 |
| 2003/0147302 A1 * | 8/2003 | Uesugi et al. | 366/164.6 |
| 2003/0230649 A1 * | 12/2003 | Nagaoka et al. | 239/585.1 |
| 2006/0257663 A1 * | 11/2006 | Doll et al. | 428/408 |
| 2011/0067770 A1 * | 3/2011 | Pederson et al. | 137/625.15 |

FOREIGN PATENT DOCUMENTS

| | | |
|---|---|---|
| JP | 2006-101772 A | 4/1994 |
| JP | 2006-227882 A | 8/1994 |
| JP | 2008-159304 A | 6/1996 |
| JP | 2001-280728 A | 10/2001 |
| JP | 2003-166656 A | 6/2003 |

* cited by examiner

VALVE WITH LOW FRICTION COATING

CROSS REFERENCE RELATED APPLICATION INFORMATION

This application claims priority from U.S. Provisional Patent Application No. 60/550,782, filed Mar. 5, 2004. The contents of these applications are incorporated herein by reference.

FIELD OF THE INVENTION

This invention relates to valves and, in particular, to high pressure valves used in instrumentation for chemical analysis in which such valves are subjected to repeated open and close cycles and harsh solvents.

BACKGROUND OF THE INVENTION

This invention relates to valves having moving parts under loads. These parts often must retain fluid integrity, that is, such parts should not leak fluids. However, as the valve are cycled between an open and a closed position, the loads placed on the moving parts cause wear. The loads on moving parts, typically a stator and a rotor, of a valve used in analytical instruments can be substantial. Analytical instruments, such as high performance chromatography (HPLC) pumps, typically operate at up to 3,000 pounds per square inch (psi). There is substantial interest in operating at even higher pressures. This paper will use the term "ultra" to refer to pressures above approximately 4,000 psi. However, there are many fluidic components which operate at low pressures of one to several hundred psi which exhibit high numbers of cycles.

As the pressure of the system increases the wear on the moving parts of the valve increases and the cycles which a valve can withstand are reduced. A typical valve can only withstand 150,000 cycles at these ultra pressures.

Valves capable of operating at higher pressures and exhibit tolerance to more than 150,000 are very desirable.

SUMMARY OF THE INVENTION

Embodiments of the present invention feature a method and device for controlling the flow of fluid. One embodiment of the device for controlling the flow of fluid comprises a rotor, stator and compression means. The rotor has a rotor fluid communication means and at least one rotor load bearing surface. The rotor load bearing surface sealably engages a stationary load bearing surface. The rotor is capable of assuming a first position and a second position by rotation. The stator has a stationary load bearing surface having stator fluid communication means. The stationary load bearing surface sealably engages the rotor load bearing surface and permits rotation of the rotor with respect to the stator. The rotation of the rotor provides a first position where the rotor fluid communication means and the stator fluid communication means prevent the flow of fluid and a second position wherein the rotor fluid communication and stator fluid communication means permits the flow of fluid. At least one of the rotor bearing surface and said stator load bearing surface has a diamond-like carbon-silica coating. Compression means holds the stator and rotor. The stator and rotor are held with the rotor load bearing surface and stationary load bearing surface sealably engaged. The diamond-like carbon-silica coating provides low friction and increased hardness allowing repeated movement between said first and second positions.

Indeed, embodiments of the present invention are capable of over 900,000 cycles. The number of cycles exceed the number previously attained with valves without a diamond-like carbon silica coating by a factor of six. These results are surprising and unexpected.

Preferably, compression means is a housing. A typical valve housing a chamber for receiving said rotor and a means for holding at least one stator. Means for holding the stator are known in the art and may comprise clamps, screws, and cooperating threads on the stator and housing.

The stator fluid communication means may comprise at least one stator opening in said stator. The stator opening is placed in fluid communication with a conduit. Preferably the stator has two stator openings, one in communication with an inlet conduit and one in communication with a discharge conduit. In the alternative the housing may have an opening for placing fluid in communication with a conduit and rotor fluid communication means. Rotor fluid communication means comprises at least one opening one or more a channels for placing two or more stator openings in fluid communication.

Preferably, the diamond-like carbon-silica coating is 40-90% carbon, 20-40% hydrogen and 0.01 to 5% silica carbon; and, more preferably, 50-80% carbon, 25-35% hydrogen and 0.1 to 5% silica-carbon base. A preferred diamond-like carbon-silica coating is a DLC coating available from Morgan Advanced Ceramics, Inc. (Allentown, Pa., USA).

Preferably, at least one of the rotor and the stator is comprised of a material selected from polyetheretherketone, tetrafluoroethelene, combinations of polyetheretherketone and tetrafluoroethelene, stainless steel, titanium and aluminum. Preferred combinations of polyetheretherketone and tetrafluoroethelene have a percentage of 50 to 90 percent polyetheretherketone and a percentage of 10 to 50 percent tetrafluoroethelene. Even more preferred, the combination has a percentage of 60 to 80 percent polyetheretherketone and a percentage of 20 to 40 percent tetrafluoroethelene.

Preferably, at least one of the rotor and the stator is made of stainless steel, titanium and aluminum and at least one of said rotor and stator is comprised of polyetheretherketone and tetrafluoroethelene and combinations of polyetheretherketone and tetrafluoroethelene. The rotor and stator comprised of stainless steel, titanium and aluminum, preferably has the diamond-like carbon silica coating.

A further embodiment of the present invention comprises a method of controlling the flow of fluid. The method comprising the steps of providing a device having a rotor, at least one stator and compression means. The rotor has a rotor fluid communication means and at least one rotor load bearing surface which rotor load bearing surface sealably engages a stationary load bearing surface. The rotor is capable of assuming a first position and a second position by rotation. The stator has a stationary load bearing surface having stator fluid communication means. The stationary load bearing surface sealably engages the When the rotor is in the first position, the rotor fluid communication means and the stator fluid communication means prevent the flow of fluid. When the rotor is in the second position the rotor fluid communication and stator fluid communication means permits the flow of fluid. At least one of the rotor bearing surface and the stator load bearing surface has a diamond-like carbon-silica coating. The compression means holds the stator and rotor with the rotor load bearing surface and stationary load bearing surface sealably engaged. The diamond-like carbon silica coating providing a low friction and increased hardness to the surface to which it is applied allowing repeated movement between the first and second positions. The method further comprising the step of rotating the rotor from one of the first position and the second position to the other position, to control the flow of fluid.

Embodiments of the present method and device allow a device for controlling the flow of fluid, a valve, to be cycled 300,000 to 900,000 cycles and more. These and other features and advantages will be apparent to those individuals skilled in the art upon reading and viewing the Figures and the detailed description below.

DETAILED DESCRIPTION OF THE INVENTION

Embodiments of the present invention feature will be described in detail with respect to a method and device for controlling the flow of fluid. However, individuals skilled in the art will recognize that feature of the present invention have application to other devices as well. Embodiments of the present invention have application for moving parts in any application in which a fluid under pressure may need to be contained.

Figure 1:
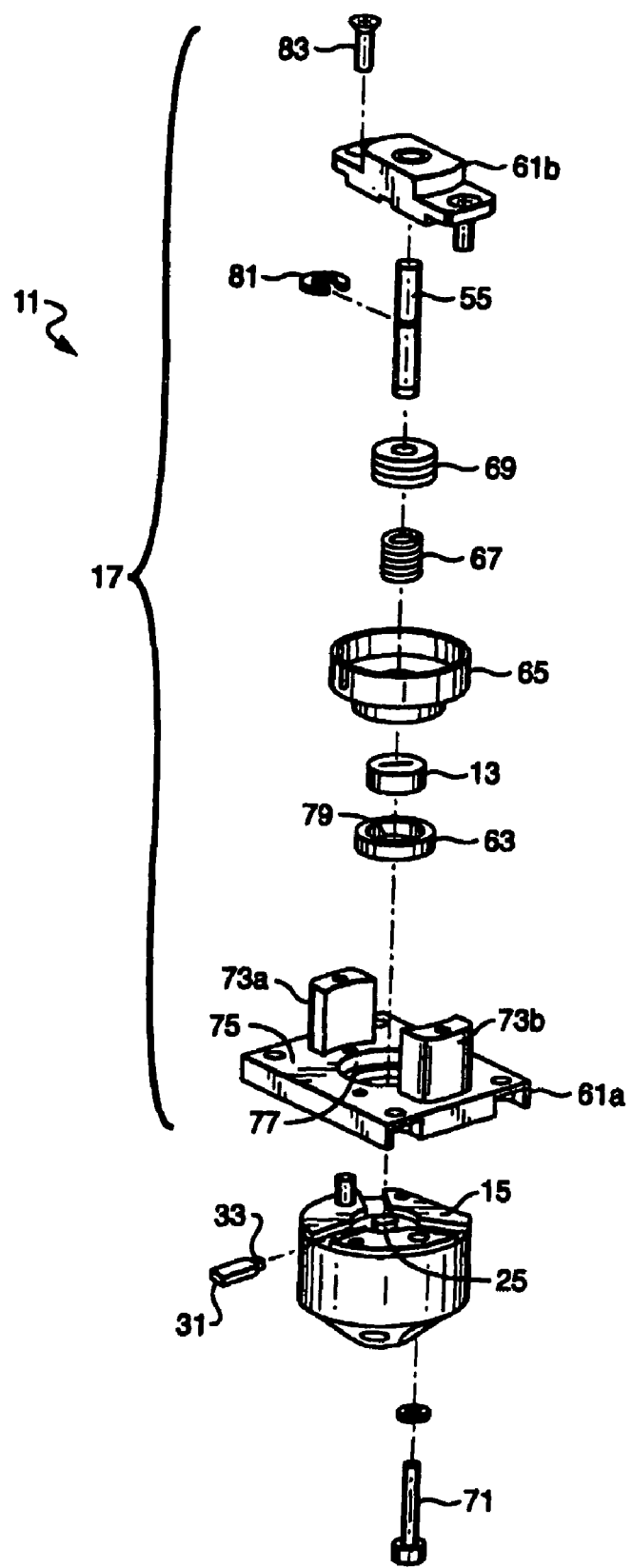
FIG. 1 depicts a device in exploded view embodying feature of the present invention.

Turning now to FIG. 1, a device for controlling the flow of fluid, generally designated by the numeral 11, is depicted in exploded view. The device 11 comprises a rotor 13, stator 15 and compression means 17.

Figure 2:
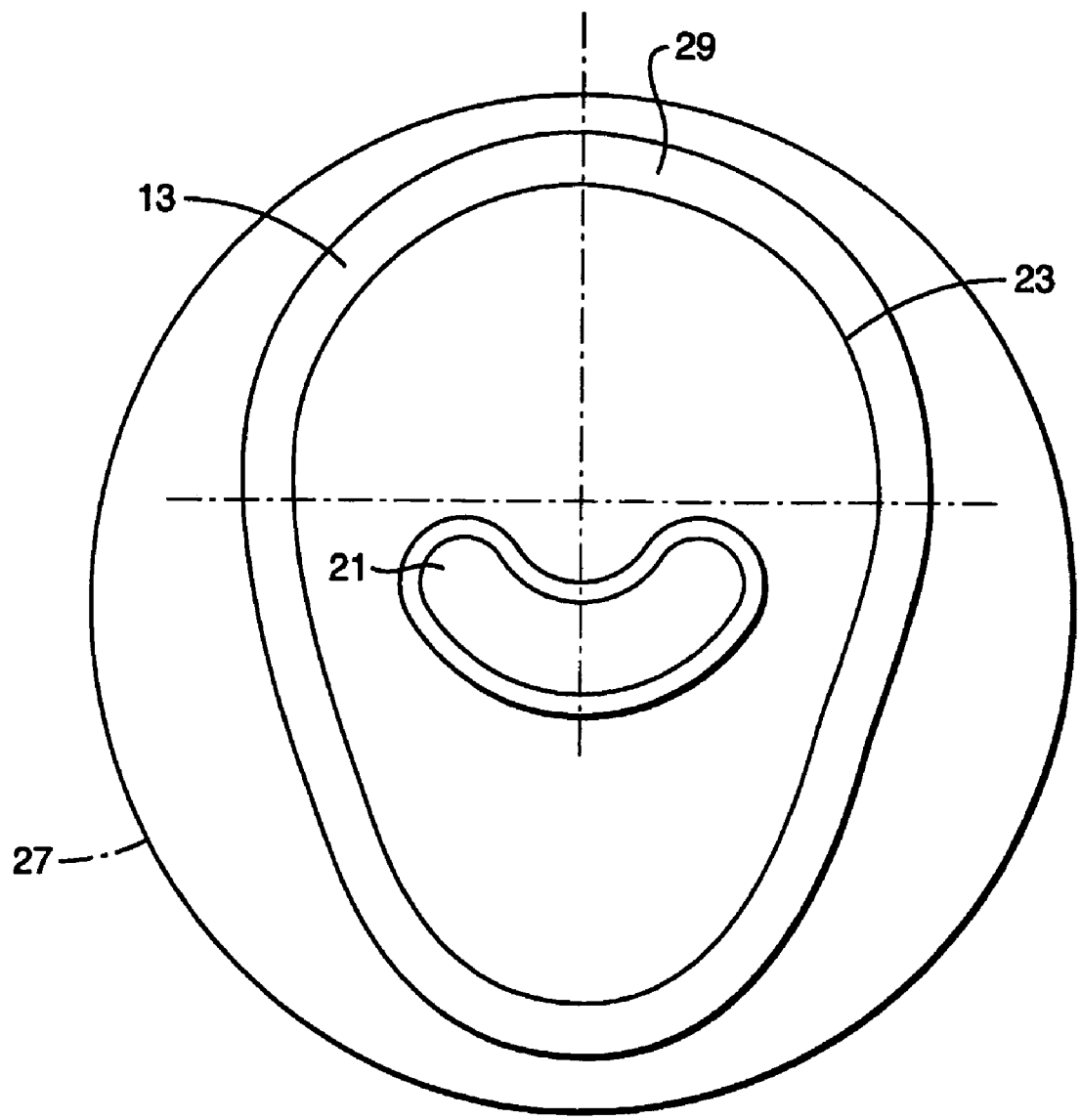
FIG. 2 depicts a rotor embodying features of the present invention.

As best seen in FIG. 2, the rotor 13 has a rotor fluid communication means in the form of a channel 21 and at least one rotor load bearing surface 23. The rotor load bearing surface 23 sealably engages a stationary load bearing surface 25 to be described with respect to the stator 15. The rotor 13 is capable of assuming a first position and a second position by rotation with respect to the stator 15. The rotor 13 has a circular wall 27 which acts as a bearing surface. The rotor has an elliptical groove 29. The elliptical groove 29 cooperates with signaling flag 31. Signaling flag 31 has a finger 33 that rides in elliptical groove 29. Signaling flag 31 projects from the stator 15 or is withdrawn towards the stator 15 depending on the position of the rotor 13.

Figure 3:
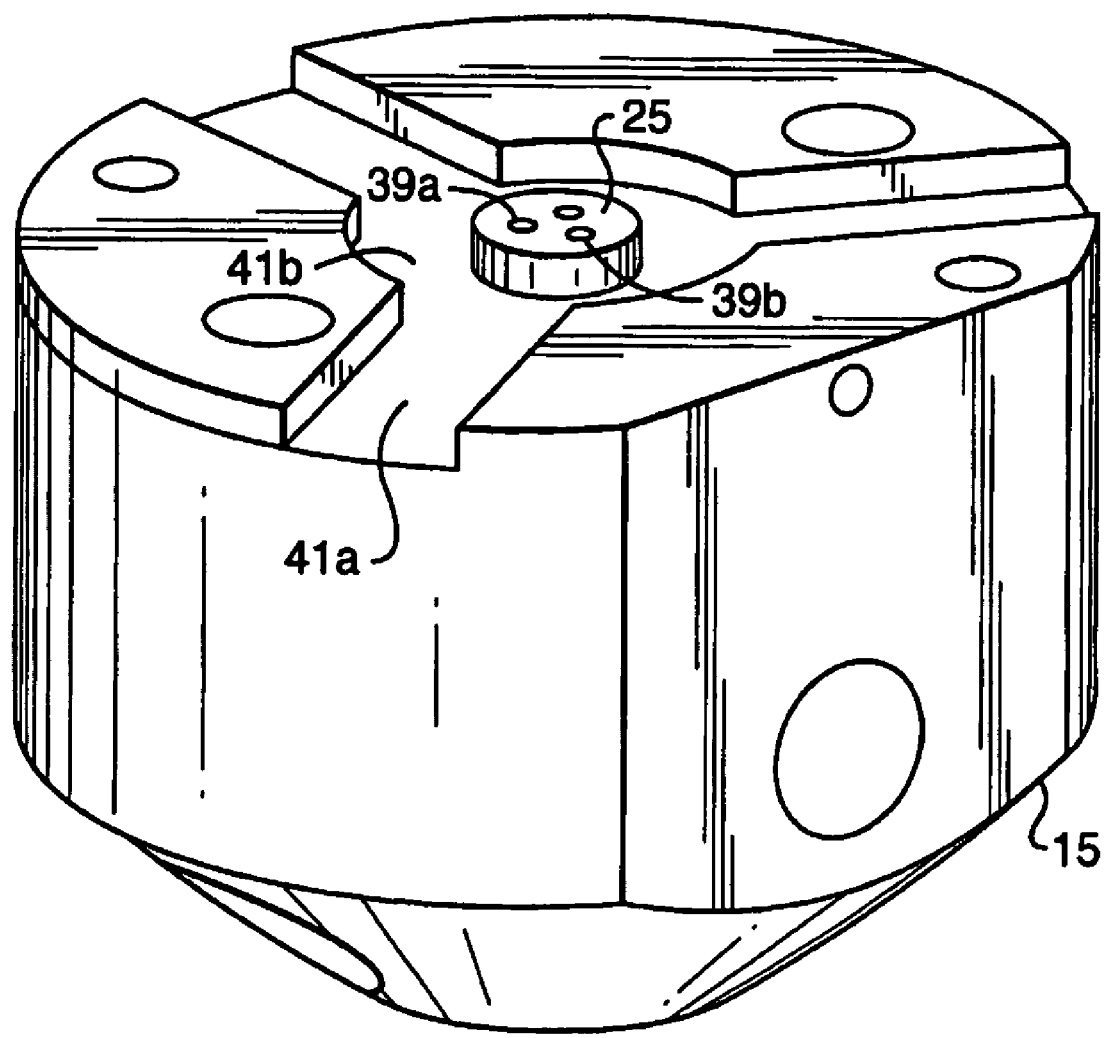
FIG. 3 depicts a stator embodying feature of the present invention.

Turning now to FIG. 1 and FIG. 3, the stator 15 has a stationary load bearing surface 25 having stator fluid communication means in the form of two openings 39*a* and 39*b*. The stationary load bearing surface 25 sealably engages the rotor load bearing surface 23 and permits rotation of the rotor 13 with respect to the stator 15.

The stator 15 has a flag channel 41*a* to hold and slidably engage signaling flag 31. A bearing channel 41*b* encircles stationary load bearing surface 25 to facilitate alignment of the rotor 13.

The rotation of the rotor 13 provides a first position where the rotor fluid communication means and the stator fluid communication means prevent the flow of fluid. Rotation of the rotor provides a second position wherein the rotor fluid communication and stator fluid communication means permits the flow of fluid. That is, in one position the channel 21 is aligned in fluid communication with the openings 39*a* and 39*b* of the stator 15 and in one position the channel is not aligned with one or more of the openings 39*a* and 39*b*. Of course, those skilled in the art will recognize that the valves can have then two positions. The terms "find position" and "second position" are intended to include any number greater then one.

In the alternative, the rotor 13 may have one or more openings (not shown) which cooperate with one or more openings, such as openings 39*a* and 39*b* in stator 15. In this embodiment, a second stator (not shown) is used to cooperate with the openings in the rotor. This second stator has further openings in the manner of stator 15 or one or more channels in the manner of rotor 13.

The stator 15 and rotor 13 are held with the rotor load bearing surface 23 and stationary load bearing surface 25 sealably engaged. At least one of the rotor bearing surface 23 and said stator load bearing surface 25 has a diamond-like carbon-silica coating. The diamond-like carbon-silica coating provides low friction and increased hardness allowing repeated movement between said first and second positions.

A preferred diamond-like carbon-silica coating is 40-90% carbon, 20-40% hydrogen and 0.01 to 5% silica carbon; and, more preferably, 50-80% carbon, 25-35% hydrogen and 0.1 to 5% silica-carbon base. A preferred diamond-like carbon-silica coating is a DLC coating available from Morgan Advanced Ceramics, Inc. (Allentown, Pa., USA). Diamond-like carbon silica coatings and methods of applying such coating on surface like stationary load bearing surface 25 and rotor load bearing surface 23 are taught in the following U.S. Pat. Nos. 4,382,100, 5,135,808, 5,190,807, 5,268,217, 5,506,038, 5,508,092, 5,508,368, 5,527,596, 5,618,619, 5,635,245, 5,643,423, 5,653,812, 5,679,413 and 5,844,225.

Preferably, at least one of the rotor 13 and the stator 15 is comprised of a material selected from polyetheretherketone, tetrafluoroethelene, combinations of polyetheretherketone and tetrafluoroethelene, stainless steel, titanium and aluminum. A preferred combination of polyetheretherketone and tetrafluoroethelene has a percentage of 50 to 90 percent polyetheretherketone and a percentage of 10 to 50 percent tetrafluoroethelene. Even more preferred, the combination has a percentage of 60 to 80 percent polyetheretherketone and a percentage of 20 to 40 percent tetrafluoroethelene.

Preferably, at least one of the rotor 13 and the stator 15 is made of stainless steel, titanium and aluminum and at least one of said rotor 13 and stator 15 is comprised of polyetheretherketone and tetrafluoroethelene and combinations of polyetheretherketone and tetrafluoroethelene. The rotor 13 and stator 15 comprised of stainless steel, titanium and aluminum, preferably has the diamond-like carbon silica coating. As illustrated, the rotor 13 is made of stainless steel and rotor bearing surface 23 has a diamond-like carbon silica coating.

To facilitate turning rotor 13 to the first position and/or the second position, rotor 13 is connected to or linked to shaft 55. Rotation of shaft 55 causes corresponding rotation of the rotor 13. In a typical application of the device 11, shaft 55 would be coupled to a motor (not shown).

Compression means 17 for holding the stator 15 and rotor 13 comprises a housing 61*a* and 61*b*, rotor bearing 63, rotor wheel 65, spring 67, and bearing assembly 69.

Housing 61*a* and 61*b* has a lower housing unit 61*a* and an upper housing unit 61*b*. Lower housing unit 61*a* receives the stator 15 and is secured by suitable means such as screws 71 or pins (not shown), clamps (not shown), or other suitable holding devices. Lower housing unit 61*a* and stator 15 can be made as a unitary structure. Lower housing unit 61*a* has projections 73*a* and 73*b* extending from a flat planar surface 75. Projections 73*a* and 73*b* provide space to accommodate other parts of the compression means 17.

Lower housing unit 61*a* has a bearing opening 77 to receive rotor bearing 63. Rotor bearing 63 has a rotor opening 79.

Rotor 13 is held in rotor opening 79 in rotor bearing 63 and rotor bearing 63 is held in bearing opening 77 allowing rotor 13 to rotate within lower housing 41a. Rotor 13 or rotor bearing 63 nest in bearing channel 41 of stator 15 to facilitate positioning of the rotor 13.

Rotor wheel 65 is keyed to rotor 13 and as assembled is visible and capable of manual manipulation projecting through a space between projection 73a and 73b of lower housing unit 61a. Rotor wheel 65 provides means for manually turning rotor 13 and provides means for placing optical codes (not shown) to be read by optical sensors (not shown) in communication with computer means (not shown).

Spring 67 biases the rotor 13, rotor wheel 65 against stator 15. Spring 67 is placed around rotor shaft 55 and compressed upon assembly by bearing assembly 69. Shaft retaining clip 81 retains the shaft 55 within the upper housing unit 61b. And, upper housing unit 61b is secured to the lower housing unit 61a by screws 83, or pins, clamps and other by suitable means.

A further embodiment of the present invention comprises a method of controlling the flow of fluid. This method will be described with respect to the operation of the device 11. The method comprising the steps of providing a device having a rotor 13, at least one stator 15 and compression means 17. The rotor 13 has a channel 21 and at least one rotor load bearing surface 23 which rotor load bearing surface sealably engages a stationary load bearing surface 25. The rotor 13 is capable of assuming a first position and a second position by rotation. The stator 15 has a stationary load bearing surface 25 having openings 39a and 39b. The stationary load bearing surface 25 sealably engages the rotor load bearing surface 23. The rotor 13 has at least two positions upon rotation. When the rotor is in the first position, the channel 23 and the openings 39a and 39b are not aligned and prevent the flow of fluid. When the rotor is in the second position the channel 21 and openings 39a and 39b are aligned and permit the flow of fluid.

At least one of the rotor hearing surface 23 and the stator load bearing surface 25 as a diamond-like carbon-silica coating. The compression means holds the stator 15 and rotor 13 with the rotor load bearing surface 23 and stationary load bearing surface 25 sealably engaged. The diamond-like carbon silica coating providing a low friction and increased hardness to the surface to which it is applied allowing repeated movement between the first and second positions. The method further comprising the step of rotating the rotor 13 from one of the first position and the second position to the other position, to control the flow of fluid.

Embodiments of the present method and device allow a device for controlling the flow of fluid, a valve, to be cycled 300,000 to 900,000 cycles and more. Indeed, embodiments of the present invention are capable of over 900,000 cycles. The number of cycles exceed the number previously attained with valves without a diamond-like carbon silica coating by a factor of six. These results are surprising and unexpected.

Thus, embodiments of the present invention have been described with the understanding that the description is that of a preferred embodiment and the best mode of making and using the present invention. Those skilled in the art will recognize that the features described herein can be further modified and altered and therefore the present invention should not be so limited but should encompass the subject matter of the claims that follow.

The invention claimed is:

1. A device for controlling the flow of fluid comprising:
   a. a rotor having a rotor fluid communication means and a rotor load bearing surface which rotor load bearing surface sealably engages a stationary load bearing surface, said rotor capable of assuming a first position and a second position by rotation;
   b. at least one stator having said stationary load bearing surface having stator fluid communication means, said stationary load bearing surface sealably engaging said rotor load bearing surface and permitting rotation of said rotor with respect to said stator; at least one of said rotor bearing surface and said stationary load bearing surface having a diamond-like carbon-silica coating;
   c. compression means for holding said at least one stator and rotor with said rotor load bearing surface and stationary load bearing surface sealably engaged, and said diamond-like carbon-silica coating providing a low friction and increased hardness allowing repeated movement between said first and second positions.

2. The device of claim 1 wherein said compression means is a housing, said housing having a chamber for receiving said rotor and a means for securing said at least one stator.

3. The device of claim 1 wherein said stator fluid communication means is at least one stator opening in said stator.

4. The device of claim 1 wherein said rotor fluid communication means comprises at least one opening.

5. The device of claim 3 wherein said rotor fluid communication means comprises a channel for placing two or more stator openings in fluid communication.

6. The device of claim 1 wherein said diamond-like carbon-silica coating is 40-90% carbon, 20-40% hydrogen and 0.01 to 5% silica carbon.

7. The device of claim 6 wherein said diamond like carbon-silica coating comprises a DLC coating.

8. The device of claim 1 wherein at least one of said rotor and stator is comprised of a material selected from the group consisting of polyetheretherketone, tetrafluoroethelene, combinations of polyetheretherketone and tetrafluoroethelene, stainless steel, titanium and aluminum.

9. The device of claim 8 wherein said combination of polyetheretherketone and tetrafluoroethelene has a percentage of 50 to 90 percent polyetheretherketone and a percentage of 10 to 50 percent tetrafluoroethelene.

10. The device of claim 8 wherein said combination of polyetheretherketone and tetrafluoroethelene has a percentage of 60 to 80 percent polyetheretherketone and a percentage of 20 to 40 percent tetrafluoroethelene.

11. The device of claim 8 wherein one of said rotor and stator is comprised of stainless steel, titanium and aluminum and the other of said rotor and stator is comprised of polyetheretherketone and tetrafluoroethelene and combinations of polyetheretherketone and tetrafluoroethelene, wherein whichever of said rotor and stator is comprised of stainless steel, titanium and aluminum further has said diamond-like carbon silica coating.

12. A method of controlling the flow of fluid comprising the steps of:
   providing a device having a rotor, at least one stator and compression means wherein said rotor has a rotor fluid communication means and a rotor load bearing surface which rotor load bearing surface sealably engages a stationary load bearing surface, said rotor capable of assuming a first position and a second position by rotation; and said at least one stator has said stationary load bearing surface having stator fluid communication means, said stationary load bearing surface sealably engaging said rotor load bearing surface and permitting rotation of said rotor with respect to said stator; at least one of said rotor bearing surface and said stationary load bearing surface having a diamond like carbon-silica coating; and said compression means for holding said at least one stator and rotor with said rotor load bearing surface and stationary load bearing surface sealably engaged, and said diamond-like carbon-silica coating providing a low friction and increased hardness allowing repeated movement between said first and second positions;

rotating said rotor from one of said first position and said second position to the other position, to control the flow of fluid.

13. The method of claim 12 wherein said compression means is a housing, said housing having a chamber for receiving said rotor and means for securing said at least one stator.

14. The method of claim 12 wherein said stator fluid communication means is at least one stator opening in said stator.

15. The method of claim 12 wherein said rotor fluid communication means comprises at least one opening.

16. The method of claim 14 wherein said rotor fluid communication means comprises a channel for placing two or more stator openings in fluid communication.

17. The method of claim 12 wherein said diamond-like carbon-silica coating is 40-90% carbon, 20-40% hydrogen and 0.01 to 5% silica carbon.

18. The method of claim 17 wherein said diamond-like carbon-silica coating comprises a DLC coating.

19. The method of claim 12 wherein at least one of said rotor and stator is comprised of a material selected from the group consisting of polyetheretherketone, tetrafluoroethelene, combinations of polyetheretherketone and tetrafluoroethelene, stainless steel, titanium and aluminum.

20. The method of claim 19 wherein said combination of polyetheretherketone and tetrafluoroethelene has a percentage of 50 to 90 percent polyetheretherketone and a percentage of 10 to 50 percent tetrafluoroethelene.

21. The method of claim 19 wherein said combination of polyetheretherketone and tetrafluoroethelene has a percentage of 60 to 80 percent polyetheretherketone and a percentage of 20 to 40 percent tetrafluoroethelene.

22. The method of claim 19 wherein one of said rotor and stator is comprised of stainless steel, titanium and aluminum and the other of said rotor and stator is comprised of polyetheretherketone and tetrafluoroethelene and combinations of polyetheretherketone and tetrafluoroethelene, wherein whichever of said rotor and stator is comprised of stainless steel, titanium and aluminum further has said diamond-like carbon silica coating.

23. The device of claim 1, wherein said rotor is capable of assuming more than two positions by rotation.

* * * * *